United States Patent
Beavin et al.

(10) Patent No.: US 6,571,233 B2
(45) Date of Patent: May 27, 2003

(54) OPTIMIZATION OF SQL QUERIES USING FILTERING PREDICATES

(75) Inventors: Thomas A. Beavin, Milpitas, CA (US); Patrick M. Malone, Campbell, CA (US); Jerry Mukai, San Jose, CA (US); Randy M. Nakagawa, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 197 days.

(21) Appl. No.: 09/734,123

(22) Filed: Dec. 6, 2000

(65) Prior Publication Data

US 2002/0069193 A1 Jun. 6, 2002

(51) Int. Cl.⁷ .......................... G06F 17/30; G06F 7/00
(52) U.S. Cl. ..................... 707/2; 707/4; 707/5
(58) Field of Search .................. 707/1, 2, 3, 4, 707/5, 6, 100, 200

(56) References Cited

U.S. PATENT DOCUMENTS

| | | | |
|---|---|---|---|
| 5,367,675 A | 11/1994 | Cheng et al. | 395/600 |
| 5,590,324 A | 12/1996 | Leung et al. | 395/605 |
| 5,615,361 A | 3/1997 | Leung et al. | 395/603 |
| 5,680,603 A | 10/1997 | Bhargava et al. | 395/602 |
| 5,706,495 A * | 1/1998 | Chadha et al. | 707/2 |
| 5,826,076 A | 10/1998 | Bradley et al. | 395/604 |
| 5,864,847 A | 1/1999 | Goel et al. | 707/4 |
| 5,875,447 A | 2/1999 | Goel et al. | 707/4 |
| 5,895,465 A | 4/1999 | Guha | 707/4 |
| 5,960,427 A | 9/1999 | Goel et al. | 707/4 |
| 5,963,933 A | 10/1999 | Cheng et al. | 707/2 |
| 6,081,799 A * | 6/2000 | Beavin et al. | 707/2 |
| 6,327,587 B1 * | 12/2001 | Forster | 706/45 |
| 2002/0083049 A1 * | 6/2002 | Forster et al. | 707/3 |

OTHER PUBLICATIONS

Song Xue, Microsoft Technet Article: SQL Server 2000 Windows CE Edition 2.0 Query Processor Overview and Performance Tuning Approaches, Oct. 2002, pp. 15–16.*

"DB2 Cost Formula", IBM Technical Disclosure Bulletin, 34:12, No. 12, p. 389–394, May 1992.

"Access Path Selection in a Relational Database Management System", IBM Technical Disclosure Bulletin, vol. 22, No. 4, pp. 1657–1660, Sep. 1979.

Dalamagas, T. et al. "A visual database system for spatial and non–spatial data management", Visual Database Systems 4 (VDB4). IFIP TC2/WG2.6 Fourth Working Conference on Visual Database Systems 4 (VDB4), pp. 105–122, Published: London, UK 1998, vii+380 pp.

Ubell, M. et al. "Embedding image query operations in an object–relational database management system", Proceedings of the SPIE—The International Society for Optical Engineering, vol. 2420, pp. 203, 1995.

Griffiths, S. P. et al. "Access path selection in a relational database management system", Rpt. No. RJ2429 (32240). Aug. 1, 1979, 59 pp.

O'Neil, P. et al. "Improved query performance with variant indexes", SIGMOD Record, vol. 26, No. 2, pp. 38–49, Jun. 1997.

* cited by examiner

*Primary Examiner*—Diane D. Mizrahi
*Assistant Examiner*—Michael Spiegel
(74) *Attorney, Agent, or Firm*—Gates & Cooper LLP (57) ABSTRACT

A technique for optimizing execution of a query that accesses data stored on a data store connected to a computer. Query predicates involving different data types are identified. A second query predicate is generated which includes matching data types, and if necessary, converted operators. The second query predicate with the matching data types and/or converted operators is executed to obtain a subset of records using an index manager or data manager. The subset of records is converted to the data types of the remaining query predicates. The first query predicate is applied against the subset of records to obtain a result, and the remaining query predicates of the original query are applied to the result of the first query predicate and any other additional converted query predicates to obtain a final result.

45 Claims, 5 Drawing Sheets

Table t1

| Column c1 (410) | Column c2 (420) | Column c3 (430) |
|---|---|---|
| 1, | 2, | 3 |
| 0, | 1, | 3 |
| 0, | 2, | 2 |
| 0, | 2, | 3 |
| 0, | 2, | 4 |
| 0, | 3, | 5 |
| 1, | 1, | 2 |
| 1, | 2, | 2 |
| 1, | 2, | 3 |
| 1, | 2, | 4 |
| 1, | 3, | 5 |
| 2, | 1, | 1 |
| 2, | 2, | 2 |
| 2, | 2, | 3 |
| 2, | 2, | 4 |
| 2, | 3, | 1 |
| 3, | 2, | 3 |

OPTIMIZATION OF SQL QUERIES USING FILTERING PREDICATES

FIELD OF THE INVENTION

This invention relates in general to database management systems performed by computers, and in particular, to processing query predicates having data types.

BACKGROUND OF THE INVENTION

Databases are computerized information storage and retrieval systems. A Relational Database Management System (RDBMS) is a database management system (DBMS) which uses relational techniques for storing and retrieving data. Relational databases are organized into tables which consist of rows and columns of data. The rows are formally called tuples. A database will typically have many tables and each table will typically have multiple tuples and multiple columns. The tables are typically stored on direct access storage devices (DASD) such as magnetic or optical disk drives for semi-permanent storage.

RDBMS software using a Structured Query Language (SQL) interface is well known in the art. The SQL interface has evolved into a standard language for RDBMS software and has been adopted as such by both the American National Standards Institute (ANSI) and the International Standards Organization (ISO). The SQL interface allows users to formulate relational operations on the tables either interactively, in batch files, or embedded in host languages, such as C and COBOL. SQL allows the user to manipulate the data.

The definitions for SQL provide that a RDBMS should respond to a particular query with a particular set of data given a specified database content, but the method that the RDBMS uses to actually find the required information in the tables on the disk drives is left up to the RDBMS. Typically, there will be more than one method that can be used by the RDBMS to access the required data. The RDBMS will optimize the method used to find the data requested in a query in order to minimize the computer time used and, therefore, the cost of doing the query.

A RDBMS can support certain data types. Applications that utilize the RDBMS (e.g., C or JAVA) may or may not support these same data types as a RDBMS. For example, the RDBMS of the DB2® product offered by IBM® for the OS/390® operating systems can support string and numeric data types. String data types include character and graphic, both of which may be fixed length or varying length. Numeric data types include binary integer, floating point, and decimal. Applications that are written in C, for example, do not have decimal data types, and JAVA strings are defined without character length attributes.

Conventional systems process query predicates with different data types by retrieving an entire set of data, converting the data type of the entire data set to match the data types of the predicate, then performing filtering on all of the rows of the data set based on the predicate conditions. As a result, conventional systems perform unnecessary data conversions and comparisons because there is not a technique to retrieve a subset of data as compared to an entire set of data, and to perform subsequent conversions and comparisons on the subset of data.

An SQL query predicate may request rows of data based on the comparison that a variable have a value greater than 1.5 (i.e., a floating or decimal data type). The table rows, however, may have an integer data type. In this case, conventional systems make a temporary copy of the integer, convert the integer to decimal, retrieve all of the table rows from the table, and then filter the results based on the query predicate. Consequently, the RDS performs tasks which otherwise would not be required if the data types matched. The RDS retrieves all of the rows, converts all of the rows, and compares all of the rows to the conditions set forth in the query predicate. As a result, more time is required to transfer, convert, process and filter the data to obtain a result leading to diminished system performance. These shortcomings are further amplified when large amounts of data are retrieved from an RDS or if complex query predicates are involved.

Thus, there is a need in the art for improved query optimization that is able to process query predicates with different data types than those data types utilized by a RDS and to relieve the RDS from having to transfer, convert, and compare all of the rows in order to obtain a result.

SUMMARY OF THE INVENTION

To overcome the limitations in the prior art described above, and to overcome other limitations that will become apparent upon reading and understanding the present specification, the present invention discloses a method, apparatus, and article of manufacture for retrieving smaller data sets for query predicates with data type mismatches.

According to an embodiment of the invention, a technique is provided for optimizing execution of a query that accesses data stored on a data store connected to a computer. Initially, a first query predicate comparing different data types is identified. A second query predicate with matching data types is generated. Then, the generated second query predicate is executed against the database to obtain a subset of records.

BRIEF DESCRIPTION OF THE DRAWINGS

Referring now to the drawings in which like reference numbers represent corresponding parts throughout.

DETAILED DESCRIPTION OF AN EMBODIMENT

In the following description of embodiments of the invention, reference is made to the accompanying drawings which form a part hereof, and which is shown by way of illustration specific embodiments in which the invention may be practiced. It is to be understood that other embodiments may be utilized as structural changes may be made without departing from the scope of the present invention.

Hardware Environment

Figure 1:
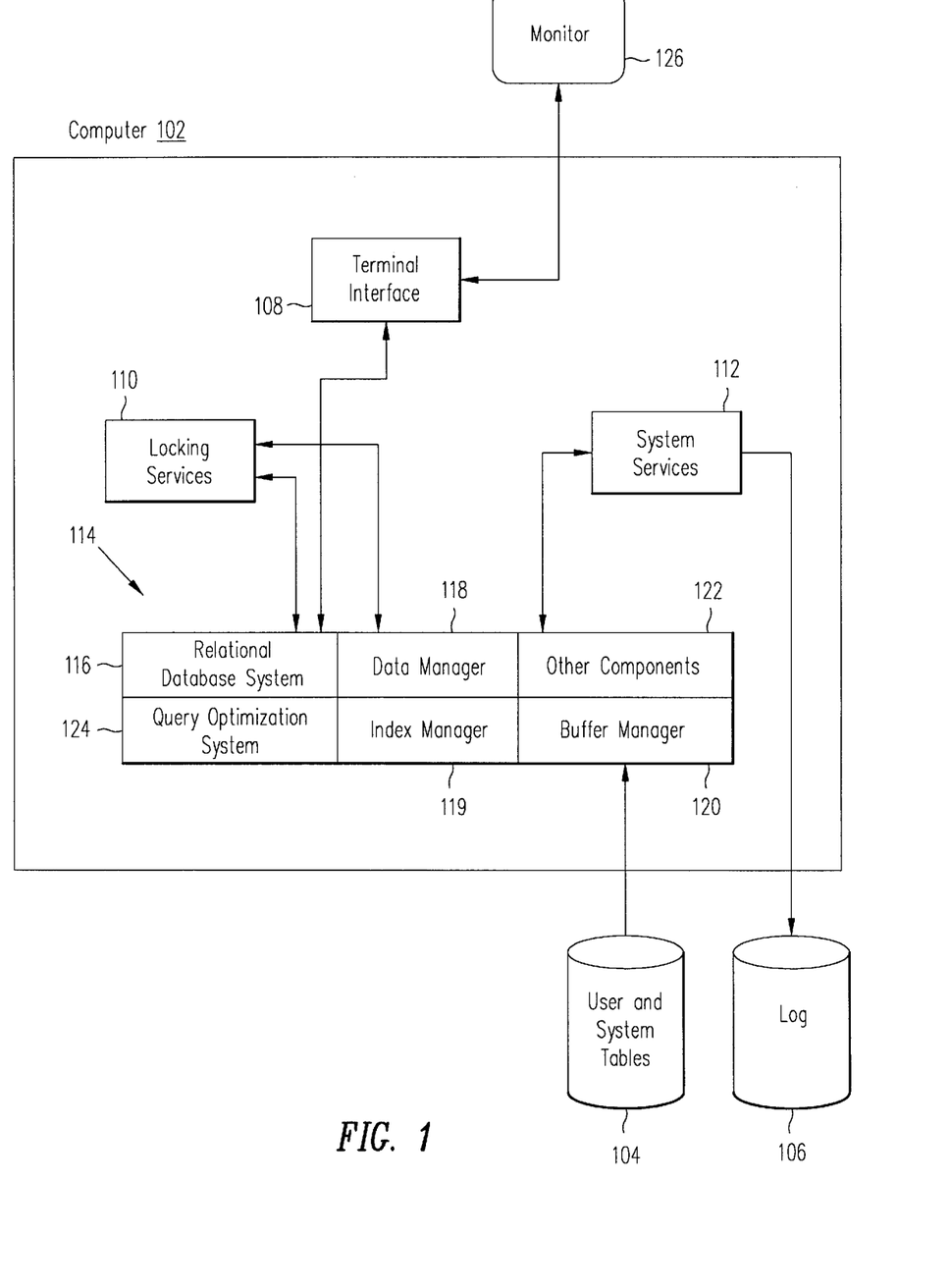
FIG. 1 is a block diagram illustrating components of a hardware environment incorporating the query optimization system.

FIG. 1 illustrates a computer hardware environment that could be used in one embodiment of the present invention.

In the environment, a computer system 102 is comprised of one or more processors connected to one or more data storage devices 104 and 106, such as a fixed or hard disk drive, a floppy disk drive, a CD-ROM drive, a tape drive, or other devices, that store one or more relational databases.

Operators of the computer system 102 use a standard operator interface 108 to transmit electrical signals to and from the computer system 102 that represent commands for performing various search and retrieval functions, termed queries, against the databases. In the present invention, these queries conform to the Structured Query Language (SQL) standard, and invoke functions performed by Relational DataBase Management System (RDBMS) software. In one embodiment of the present invention, the DBMS software comprises the DB2® product offered by International Business Machines, Corporation for the OS/2® operating system. Those skilled in the art will recognize, however, that the present invention has application to any DBMS software whether or not the DBMS software uses SQL.

As illustrated in FIG. 1, a DB2® architecture includes three major components: the Internal Resource Lock Manager (IRLM) 110, the Systems Services module 112, and the Database Services module 114. The IRLM 110 handles locking services, because DB2® treats data as a shared resource, thereby allowing any number of users to access the same data simultaneously, and thus concurrency control is required to isolate users and to maintain data integrity. The Systems Services module 112 controls the overall DB2® execution environment, including managing log data sets 106, gathering statistics, handling startup and shutdown, and providing management support.

At the center of the DB2® architecture is the Database Services module 114. The Database Services module 114 contains several submodules, including the Relational Database System (RDS) 116, the Data Manager 118, the Index Manager 119, the Buffer Manager 120 and other components 122 such as an SQL compiler/interpreter. These submodules support the functions of the SQL language, i.e. definition, access control, interpretation, compilation, database retrieval, and update of user and system data. Additionally, a query optimization system 124 works with these submodules to optimize execution of SQL queries.

The present invention is generally implemented using SQL statements executed under the control of the Database Services module 114. The Database Services module 114 retrieves or receives SQL statements. SQL statements are generally stored in a text file on the data storage devices 104 and 106 or are interactively entered into the computer system 102 by an operator via operator interface 108. The Database Services module 114 then derives or synthesizes instructions from the SQL statements for execution by the computer system 102. Generally, the RDS 116 software, the SQL statements, and the instructions derived therefrom, are all tangibly embodied in and/or readable from a computer-readable medium, e.g. one or more of the data storage devices 104 and 106.

Moreover, the RDS 116 software, SQL statements, and instructions derived therefrom, are all comprised of instructions which, when read and executed by the computer system 102, causes the computer system 102 to perform the steps necessary to implement and/or use the present invention. Under control of an operating system, the RDS 116 software, SQL statements, and instructions derived therefrom, may be loaded from the data storage devices 104 and 106 into a memory of the computer system 102 for use during actual operations.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the exemplary environment illustrated in FIG. 1 is not intended to limit the present invention. Indeed, those skilled in the art will recognize that other alternative hardware environments and data types may be used with the present invention without departing from the scope of the present invention.

Data Types

Figure 2:
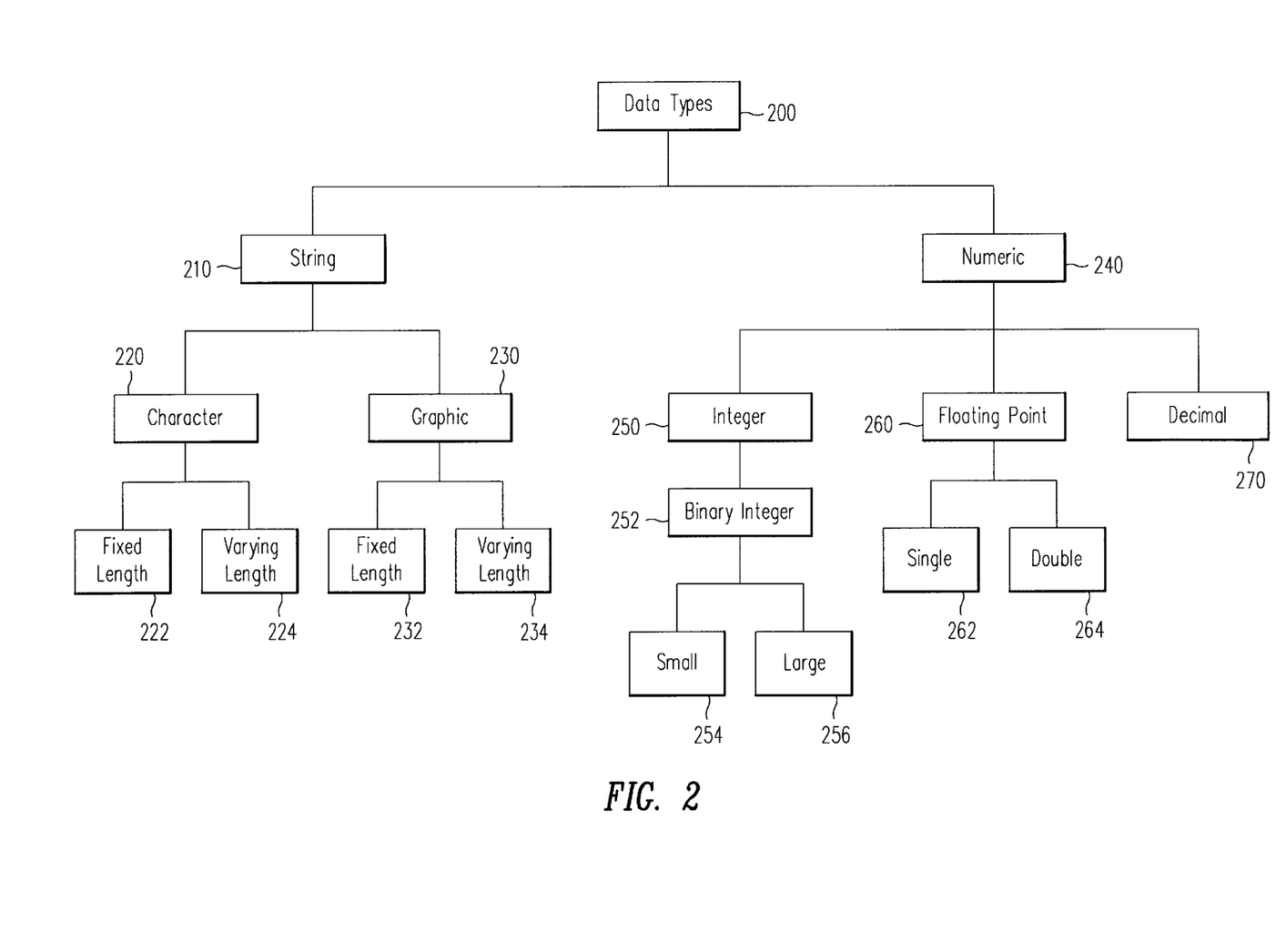
FIG. 2 is a block diagram illustrating different data types that may be processed by a database query.

FIG. 2 is a diagram illustrating different data types of data that may be processed by a database query. The query optimization system 124 may process SQL statements involving data with these different data attributes. For example, a SQL statement may process string data 200. A string 210 may be either a character string 220 or a graphic string 230. A character string 220 may be a fixed length character string 222 or a varying length character string 224. A variable-length field is one whose length can be different in each record depending on what data is stored in the field whereas a fixed length field can not be adjusted. In addition, the data type of data processed by a predicate may be a numeric value 240. The numeric value 240 may be an integer 250 or "binary integer" 252, a floating point number 260, or a decimal number 270.

Binary numbers are exact representations of integers or "counting numbers" or "whole numbers," thus the term "binary integers." Examples of binary integers 252 include "0," "1," "–45," and "99." Binary integers 252 may be a small integer 254 with a range of –32768 to +32767 or large integers with a range of –2147483648 to +2147483647.

In contrast, floating-point numbers 260 are approximations of real numbers. Thus, a floating-point number 260 is a real number that may contain a fractional part as compared to an integer 250 which may be considered a real number without a fractional part. For example, a floating-point number 260 may specify two numbers separated by "E" (i.e., a power of 10). The first number can include a sign and a decimal point. The second number can include a sign buy not a decimal point. Examples of floating-point numbers 260 include 15 E1, 5.4 E6, and –8.3 E–5. The term floating-point refers to the fact that there is no fixed number of digits before and after the decimal point, and thus, the decimal point may "float." A floating point number 260 can be single precision floating point number 262 or double precision floating point number 264. Precision refers to the number of bits used to represent the fractional part of the number. For example, a single-precision floating point number 262 requires 32 bits whereas a double-precision floating point number 264 includes 64 bits. Thus, a double-precision number 264 uses twice as many bits as a single-precision values and represents fractional quantities much more exactly.

Decimal numbers 270 are exact representations of real numbers. In other words, a decimal number 270 refers to numbers in base 10. For example, –4,1344, and 32 are all decimal numbers. In contrast, integers do not have decimal points, rather, they have an implicit decimal point.

In addition to the previously described data types, computer data is often represented as and converted to and from hexadecimal numbers. Hexadecimal numbers are represented with the base-16 number system. The base-16 system consists of 16 unique symbols: the numbers 0 to 9 and letters A to F. Hexadecimal numbers have either a 0x prefix or an h suffix (e.g., 0x3F7A) and may be represented as a hexadecimal number with 'x.

Those skilled in the art will recognize that the exemplary environment illustrated in FIG. 2 is not intended to limit the present invention. Indeed, those skilled in the art will recognize that other alternative hardware environments and data types may be used with the present invention without departing from the scope of the present invention.

Query Optimization System

One embodiment of the invention provides a query optimization system 124. The query optimization system 124 provides a novel technique for optimizing the execution of query predicates involving different data types. Using the query optimization system 124, fewer records may be retrieved through a Data Manager 118 or Index Manager 119. By generating a new query predicate with matching data types, data types of data within these records may be compared with original query predicate conditions such that the Data Manager 118 or Index Manager 119 may assume predicate processing tasks which would otherwise be allocated to the RDS 116. In other words, the query optimization system 124 generates new predicates such that non-sargable query predicates and some directionally-sargable query predicates are semi-sargable or sargable. For clarity, a description of these predicate descriptions is provided.

A non-sargable query predicate is a predicate that retrieves data from a database, but processes or filters all of that data against original query predicates at the relational level. In other words, all of the data sets are retrieved, and all of the data sets are applied against the original query. A Data Manager 118 or Index Manager 119 does not handle non-sargable query predicates, and thus, a RDS 116 is required to perform all of the processing and filtering.

A sargable predicate, in contrast to a non-sargable predicate, may be completely processed by a Data Manager 118 or an Index Manager 119. In other words, the Data Manager 118 or Index Manager 119 process the query predicate to obtain a result, and no additional filtering or processing is required by the RDS 116.

A semi-sargable query predicate is a predicate that is processed by both a Data Manager 118 or Index Manager 119 as well as an RDS 116. A semi-sargable query predicate contains both sargable and non-sargable elements. Initially, a query predicate may appear to be non-sargable as described above. However, by generating a second, sargable predicate, the Data Manager 118 or Index Manager 119 can process the sargable elements and relieve the RDS 116 of this predicate processing. In other words, filtering tasks are performed at the relational level and by a Data Manager 118 or Index Manager 119. The RDS 116 then applies the results obtained from the Data Manager 118 and Index Manager 119 against the remaining data sets and query predicates to further refine the results per the original predicate conditions.

A join predicate or a "directionally-sargable" predicate that contains join conditions. Initially, a directionally-sargable predicate may appear to be non-sargable predicate that must be processed solely by the RDS 116. However, it may be a semi-sargable predicate containing both sargable and non-sargable elements. More specifically, whether a sargable query predicate may be generated depends on the data types of data within the columns, the lengths of the column data, and the order in which query predicates are evaluated.

For example, the execution of an inner query predicate which utilizes a first data type may depend on the execution of an outer query predicate which utilizes a second data type. If the data type of the inner query predicate can be promoted to or converted into the data type of the outer query predicate, then a sargable query predicate can be processed by the query optimization system 124 using a Data Manager 118 or Index Manager 119. The results are then applied by against the original query by the RDS 116. However, if the inner query predicate can not be promoted to or converted into the data type of the outer query predicate, then the query predicate is not sargable. In this case, the RDS 116 must perform all of the filtering tasks called for by the query.

Assume, for example, table t1 is an outer table and table t2 is an inner table. A directionally-sargable join predicate may be select * from t1, t2 where t1.c1=t2.c1, and where table t1 contains single precision floating point row data 1.0, 1.1, and 1.2, and where table t2 contains integer row data 1, 2, and 3. A directionally sargable join predicate is processed by retrieving the first row from t1, which is 1.0, and then looping through table t2 to locate any matching rows. In this example, 1.0 is a single precision floating point number and must be converted to an integer. Since a single precision floating point number is not "promotable" to an integer, the query is non-sargable. The predicate is not sargable in part because table t1 is an outer table whereas the predicate would be sargable if table t1 was an inner table. As a result, all the rows of table t2 are retrieved, converted to 1.0, 2.0, and 3.0, and these converted values are compared against values from the out table t1 (1.0).

Figure 3:
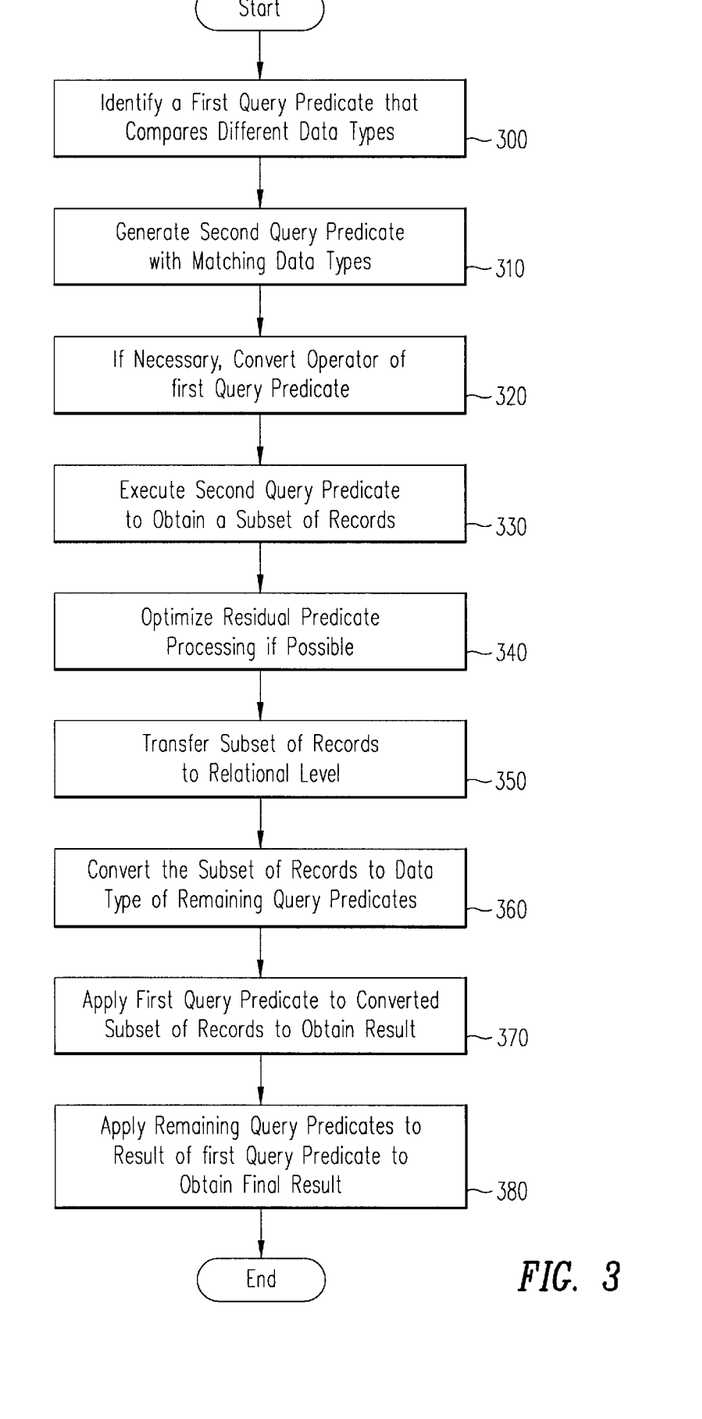
FIG. 3 is a flow diagram illustrating one embodiment of the query optimization system.

Referring now to FIG. 3, a flow chart of one embodiment of the present invention, in block 300, the query optimization system 124 identifies a first query predicate of a query that compares different data types. In block 310, the query optimization system 124 generates a second query predicate with matching data types. In block 320, if necessary, the query optimization system 124 converts the operator of the first query predicate. Continuing with block 330, the query optimization system 124 executes the second query predicate to obtain a subset of records. Then, in block 340, the query optimization system 124 optimizes the first query predicate if possible. In block 350, the query optimization system 124 transfers the subset of records to the relational level. In block 360, the query optimization system 124 converts the remaining records to the data type of the remaining query predicates. Then, in block 370, the query optimization system 124 applies the query predicate to the subset of records to obtain a result. In block 380, the query optimization system 124 applies the remaining query predicates to the result of the first query predicate and to any other results of converted query predicates to obtain a final result. These tasks will be described in further detail with illustrative examples of the manner in which the query optimization system 124 can process queries more efficiently.

Initially, in block 300, the query optimization system 124 identifies a first query predicate of a query that compares different data types. The query predicate identified may be, for example, a non-sargable predicate or a directionally-sargable join predicate that compares different data types as illustrated in FIG. 2

The query optimization system 124 enables non-sargable query predicates to be converted into semi-sargable query predicates or sargable query predicates to relieve the RDS 116 from filtering tasks. As a result, the query can be executed more efficiently with a Data Manager 118 or Index Manager 119. Following are examples of non-sargable and directionally-sargable predicates which may be identified by the query optimization system 124 and converted into semi-sargable or sargable query predicates. More specifically, the following examples illustrate how "col OP," "col BETWEEN," and "col IN" expressions and values involving different data types can be processed. Those skilled in the art will recognize that the following examples are merely illustrative of the different query predicates that may be identified and processed by the present query optimization system 124, and that these expressions and other similar expressions may also be applied to functions, non-correlated subqueries, and other items.

Non-Sargable Query Predicate: col OP value

The query predicate "col OP value" is one form of query predicate identified by the query optimization system 124 as having a data type mismatch. This non-sargable query predicate requests column data satisfying certain value conditions dictated by the operator "OP" in which the column data and value data have different data types. More specifically, "col" refers to row data within a column of a table of a RDS 116, "val" refers to a value of the data within that column, and "OP" refers to a greater than or greater exclusive operator (>), a lesser than or lesser exclusive operator (<), a greater inclusive operator ($\geq$), a lesser inclusive operator ($\leq$), or an equal to (=) operator. An example of a non-sargable query predicate assuming this form is "select c1 from t1 where c1>1.5." In this particular example, the query predicate retrieves row data from a column of a table that has a value greater than 1.5. The data type of the column may be an integer, and the data type of the value may be a floating point number. As a result, the query predicate is non-sargable since the different data types require the RDS 116 to retrieve all of the data and process all of the data to obtain a result.

Other data type mismatches may exist within this query predicate if the column has integer data and the value is a decimal, the column and value are both character strings or variable character strings but the value data has a length attribute that is greater than the length attribute of the column data, or if the column and value have the same numeric format but the value data has a length, precision or scale that is greater than the length, precision or scale of the column data. Those skilled in the art will recognize that other data type mismatches may exist in a query predicate of this form and that the query optimization system 124 may also process such query predicates.

Non-Sargable Query Predicate: col BETWEEN val 1 and val 2

Another example of a non-sargable query predicate is "col BETWEEN val 1 and val 2". This query predicate selects row data from a column that satisfies the condition that the data be between two values val1 and val 2 in which the column data and value data have different data types. In this case, the BETWEEN operator may function as an inclusive operator as compared to an exclusive OP operator. A BETWEEN predicate is equivalent to: c1$\geq$val1 AND c2$\leq$val2 where a greater than or equal to operator ($\geq$) is a greater inclusive operator, and a less than or equal to operator ($\leq$) is a lesser inclusive operator. Thus, a query predicate "select c1 from t1 where c1 BETWEEN 4 and 9" requests data in column 1 that is greater than or equal to value 4 and less than or equal to value 9 (i.e., 4, 5, 6, 7, 8, and 9).

As in the previous non-sargable predicate with an OP operator, this query predicate may involve a data type mismatch may if the values are integers and the column is a floating point number or decimal number. Further, data types may be different if column and value data types are both character strings or variable character strings but the strings have different length attributes. Additionally, a data type mismatch may result even if both values and column data have the same numeric format if the numeric formats have different length, precision, or scale attributes. Again, those skilled in the art will recognize that the query optimization system 124 may recognize other data type mismatches in such queries.

Non-sargable Query Predicate: col IN (val 1, val 2, . . . , val n)

A further example of a non-sargable query predicate is "col IN (val 1, val 2, . . . , val n)." This query predicate is similar to the previous examples but is subject to an IN operator rather than OP or BETWEEN operators. The IN operator functions as a closed set. As a result, only row values of column 1 that are equal to 4, 6, 9, or 12 will satisfy the query predicate and will be retrieved from column 1. An example of a query predicate "select c1 from t1 where c1 IN (4, 6, 9, 12) selects only values that are equal to 4, 6, 9, or 12. In other words, c1 IN (val1, val2, val n) is equivalent to c1=val1 OR c1=val 2, . . . , OR c1=val n.

Similarly, data type mismatches may result if values are integers and the column data is formatted as floating point numbers or decimals. In addition, mismatches may result if both the column data and values are character strings or variable character strings but strings with different length attributes, and if the column data and values are both numeric but the values are configured with a different length, precision or scale of the column data.

Those skilled in the art will recognize that other non-sargable query predicates may involve different data types in a number of other situations. Thus, the previous examples of query predicates with mismatched data types are merely illustrative of numerous non-sargable query predicates identified by the query optimization system 124.

Referring back to block 310 in FIG. 3, the query optimization system 124 generates a second query predicate with matching data types. The second query predicate may be a semi-sargable or sargable query predicate.

Current "Exact" Data Type Conversions

In one embodiment of the query optimization system 124, conversions between "exact" data types which are implemented in current systems. For example, the query optimization system 124 can convert from a large integer to a small integer, from a decimal with a first length to a decimal with a second length, from a decimal to an large integer, and from a decimal to a small integer in the same manner as current systems. These conversions can be utilized by the query optimization system 124 without further processing. More specifically, current systems truncate the length of an integer to the length of a small integer. For example, decimal (1.2) can be converted to integer (1). If for some reason the conversion results in an overflow, the overflow is flagged.

Current "Approximation" Data Type Conversions

In addition, the query optimization system 124 can convert between "approximation" types, for example, from a single precision floating point number to a decimal, from a single precision floating point number to an integer, from a single precision floating point number to a small integer, from a double precision floating point number to a single precision floating point number, from a double precision floating point number to a decimal, from double precision floating point number to an integer, or from a double precision floating point number to a small integer. Consequently, some element of error does result from utilizing current conversions which are based on rounding. Further, if the conversion results in any overflow, the overflow is flagged.

The previously described conversions are current conversions that may be utilized by the query optimization system 124. In other alternative embodiments, the query optimization system 124 may utilize different conversions besides the conversions described above. Thus, the previous conversions are merely illustrative of the conversions that may be processed by the query optimization system 124. These other conversions will be described in further detail.

Alternative "Approximation" Data Type Conversions

The query optimization system 124 can also utilize other conversions besides the current conversions previously described. For example, when performing conversions between a double precision floating point number to a single precision floating point number, instead of rounding on a digit, the query optimization system 124 may truncate extra digits (e.g., extra hexadecimal digits). Additionally, with conversions between a single precision floating point number to a small integer or large integer, the query optimization system 124 can truncate the entire fractional part of a single precision floating point number instead of rounding the single precision floating point number on a significant decimal digit. For example, a single precision floating point number (123.999) can be truncated to a small integer (123).

As an enhancement to current methods, the query optimization system 124 can minimize the error resulting from conversions between a single precision or double precision floating point number to a decimal by first converting the floating point number into a decimal number. The query optimization system 124 determines an approximation error, and adds or subtracts the approximation error to/from the decimal number depending on a comparison of single precision floating point numbers. More specifically, when the single precision floating point number is converted into a decimal number, an approximation error is generated. The query optimization system 124 converts the decimal number (without the approximation error) back to a new single precision floating point number. After a new single precision floating point number is generated, the query optimization system 124 compares the old and new single precision floating point numbers. If the numbers are the same, then the decimal number may be utilized without compensating for the approximation error.

However, if the new single precision floating point number is different than the old single precision floating point number, then the approximation error may be added to the decimal number for a more accurate conversion. The decision to add or subtract the conversion or approximation error is based on the operator. If the operator is a less than operator (<), then the error is added. If the operator is a greater than operator (>), then the error is subtracted.

Further, there are other factors considered by the query optimization system 124 to determine whether compensation is necessary, and if so, the magnitude of the compensation. For purposes of illustration, DECOL refers to a decimal column, FLTval refers to a floating point value, and "x" refers to an approximation error.

In one embodiment of the present invention, the query optimization system 124 optimizes and minimizes errors resulting from conversions from floating point numbers to decimal numbers by utilizing approximation errors and other processing to obtain a more accurate conversion depending on DECOL and FLT values. For example, for DECOL>FLTval and DECOL≧FLTval, the query optimization system 124 generates DECOL≦DEC (FLTval−x); for DECOL<FLTval or DECOL≦FLTval, the query optimization system 124 generates DECOL≦DEC (FLTval+x); and for DECOL=FLTval, the query optimization system 124 generates DECOL BETWEEN DEC (FLTval−x) AND DEC (FLTval+x)

where y=6 (i.e., the number of significant digits in a single precision floating point number), else x=15 (i.e., the number of significant digits in a double precision floating point number).

Further, where lobound is the low value of a decimal number, hibound is the high value of a decimal number, DEC_scale is the scale of the decimal number, and DEC_prec is the precision of the decimal number, lobound=−DEC_scale hibound=MAX (DEC_prec-DEC_scale-y, −DEC_scale)

x=ceil (log(abs(FLTVAL)))−y (i.e., ceiling of log of the absolute value of FLTVAL−y)

x=MAX (x,lobound)

x=MIN (x,hibound)

x=10**x

Utilizing the previously described approximation processes, a floating point number can be converted to a decimal number while minimizing the resulting conversion errors.

In a further embodiment of the query optimization system 124, the error resulting from converting a floating point number to a decimal number can be analyzed based on the numerical differences between the old and new floating point numbers.

In addition, if necessary, in block 320, the query optimization system 124 converts the operator of the first query predicate into a more inclusive operator to further enhance processing of the semi-sargable or sargable query predicate. Those skilled in the art will recognize, however, that the operator may be converted at different times. Operator conversion may occur after the data type conversion but before the generation of the second query predicate or before both the data type conversion and generation of the second query predicate. For example, the query optimization system 124 may convert an equal operator to a between operator. Further, the between operator may represent greater inclusive and lesser inclusive operators (e.g., ≧ and ≦). In addition, a greater exclusive operator (>) may be converted to a greater inclusive operator (≧). Similarly, a lesser exclusive operator (<) may be converted to a lesser inclusive operator (≦). Finally, an equal (=) operator may be converted to a between operator where "between" is the same as ≧ and ≦ relationships. Alternatively, an equal operator may remain an equal operator if the data type conversion has no approximation error.

With these data type and operator conversions, the expressions and non-sargable query predicates described above may involve data type conversions and/or operator conversions such that a second query predicate is generated with matching data types and operators which reduce the set of data that is retrieved and applied against remaining queries. Thus, with the second query predicate, the RDS 116 must still process and filter some rows against the data returned by a Data Manager 118 or Index Manager 119, however, fewer rows must be filtered. As a result, database queries are executed more efficiently.

Referring to block 330 of FIG. 3, the query optimization system 124 executes the second query predicate to obtain a subset of records based on the comparisons of data with the same data types.

Then, referring to block 340, the query optimization system 124 optimizes the residual predicate processing if possible. In other words, the query optimization system 124 determines whether the processing by the Data Manager 118 or Index Manager 119 is sufficient such that no further filtering or processing is required by the RDS 116. Optimization may be performed when, for example, semi-sargable or sargable query predicates are processed by the query optimization system 124, and the query predicates involve range predicates, equal predicates, or runtime techniques as described below.

When generating a second query predicate based on a range predicate, if the right side value converts into the type and length of the left side column attributes, then the query optimization system 124 does not have to apply the results received from the Data Manager 118 or Index Manager 119 to further filter the data to obtain the desired results.

Additionally, if the query predicate is an equal predicate, and if the right side value converts to the type and length of the left side column data without error, then the query optimization system 124 bypasses further processing of the data received from a Data Manager 118 or Index Manager 119 by the residual or remaining portions of the original query predicate. Thus, as in the case involving a range predicate, the Data Manager 118 or Index Manager 119 may return exactly what is requested in equal query predicates. Further, if the right side value does not convert exactly into the type and length of the left side column data, then the query optimization system 124 determines that the predicate is false since no rows will qualify the residual query processing.

To facilitate optimization efforts, the query optimization system 124 may also simplify the Runtime code by generating sargable query predicates. Although generating the sargable query predicates may return rows when none are desired, the query optimization system 124 still limits the number of rows returned from the Data Manager 118 or Index Manager 119. In other words, the query optimization system 124 will return fewer rows than if no sargable predicate existed. Thereafter, the returned rows may be evaluated against the residual query predicate, and Runtime can filter out any extra rows that may be returned to obtain the requested result.

In yet another example of optimization, if a second query predicate is generated by the query optimization system 124, and if the right side value does not convert exactly into the type and length of the left side column data, then Runtime may set the predicate to be false in the internal control block.

With this configuration, no residual predicate processing is required, and the Data Manager 118 or Index Manager 119 is informed that no further evaluation is necessary. Thus, with optimization, the query optimization system 124 may obtain a result without subsequent processing or filtering by the RDS 116.

Referring to FIG. 3, block 350, if optimization is not possible, the results of the Data Manager 118 or Index Manager 119 processing are transferred to the relational level. In block 360, the subset of records is converted to the data type of the remaining query predicates such that the first query predicate and other predicates may be executed. Then, in block 370, the first query predicate is applied to the subset of records to obtain a result. Similarly, any other query predicates may also be applied to their respective subset of records to obtain a result. In block 380, the remaining query predicates are applied to the result of the first query predicate and any results of other converted query predicates to obtain a final result.

In order to fully explain the manner in which the query optimization system 124 minimizes filtering by the RDS 116, two examples are provided. The first example relates to generating predicates with converted data length attributes, and the second example relates to maximizing the number of index key columns utilized for an index scan. Both of these examples illustrate how the query optimization system 124 can limit the amount of data retrieved and processed by a RDS 116.

Query Optimization System Application—Length Attributes

One application of the query optimization system 124 is generating second query predicates with converted data types, and more specifically, converted length attributes, to process queries more efficiently. Although the following example illustrates length attribute conversions, those skilled in the art will recognize that the query optimization system 124 can be applied to various data type conversions.

In this example, assume table t1 includes column c1 with data of a length of three characters and an index i1 based on table t1:

(t1 (c1 char(3)))
(i1 on t1 (c1)).

Table t1 includes rows:
'AAA'
'BBB' and
'CCC'

A query involving one of the previously described non-sargable query predicates may be executed against table t1 such as the predicate:

"select * from t1 where c1>C2C2C241'x.

The predicate, as currently written, is not sargable because column c1 and the requested values have different length attributes. The length attribute of column c1 is less than the length attribute of the value since len (c1)<len (lit) where lit represents a literal constant of the value. The literal constant associated with the length attribute which may be based on Extended Binary Coded Decimal (EBCD). In EBCD, C2C2C2'x represents the characters BBB in hexadecimal, and '41'x is an unprintable character. A blank is represented as '40'x. Thus, C2C2C2'41'x has a different length than the column data.

With conventional systems, when comparing character strings of different data types, the shorter string is padded with blanks '40'x. Thus, in this example, 'AAA' in hexadecimal is 'c1c1c140'x 'BBB' in hexadecimal is 'c2c2c240'x and 'CCC' in hexadecimal is 'c3c3c340'x These values are compared to 'c2c2c241'x. In order to perform the comparisons using conventional systems, a RDS 116 retrieves all of the rows of column c1 (i.e., rows 'AAA', 'BBB', and 'CCC'). The RDS 116 applies all of the rows against the query predicate to filter the rows and obtain a result. Consequently, there is no data retrieval optimization since all of the data rows must be retrieved and processed.

The query optimization system 124 overcomes these shortcomings by generating new queries with converted data types or length attributes. As a result, with the data type and operator conversions utilized by the query optimization system 124, fewer rows are retrieved, fewer rows are filtered, and a result is obtained. The query optimization system 124 converts the greater exclusive operator (>) of the original query predicate into a greater inclusive operator ($\geq$) (i.e., operator conversion). With the second query predicate embodying these conversions, a Data Manager 118 or Index Manager 119 returns rows 'BBB' and 'CCC' (as compared to all rows 'AAA', 'BBB', and 'CCC') to the RDS 116 based on the inclusive operator.

After retrieving a subset of all of the rows, the query optimization system 124 applies the subset to the original query predicate conditions which are based on a greater exclusive operator (>). With this exclusive operator, row 'BBB should not be returned to the user since the operator calls for values greater than BBB not greater than or equal to BBB. Thus, the query optimization system 124 returns rows 'BBB' and 'CCC' to the RDS 116. The RDS 116 filters out row 'BBB' based on the original residual query predicate which contains a greater exclusive operator. Thus, the query optimization system 124 obtains the same result ('CCC') but does so while retrieving and filtering fewer rows. The query optimization system 124 reduces query processing time and costs with more efficient database query processing. Although previous example involved a number of rows on a small scale involving only three rows, applied on a larger scale, the benefits of the query optimization system 124 are even more evident when processing predicates involving hundreds or thousands of rows of data.

Query Optimization Application—Maximizing Index Key Columns

Another example of how the query optimization system 124 processes queries more efficiently within the described database structure involves maximizing the number of index key columns used to retrieve data from a table. Index key columns are used by an Index Manager 119 to determine the boundaries of an index scan. More specifically, the query optimization system 124 limits retrieve data by maximizing the number of key columns which establish data boundaries of an index scan. As a result, fewer data sets are retrieved, fewer data sets are filtered, and the RDS 116 is relieved from performing filtering tasks which are performed by an Index Manager 119. Thus, the query optimization system 124 enables more efficient query processing.

The following examples illustrate how the present invention processes queries more efficiently than conventional systems. Although the present examples are related to integer and decimal data types, those skilled in the art will appreciate that the principles embodied in the following examples may be applied to a multitude of predicates with different data types, including the predicates previously described.

Figure 4:
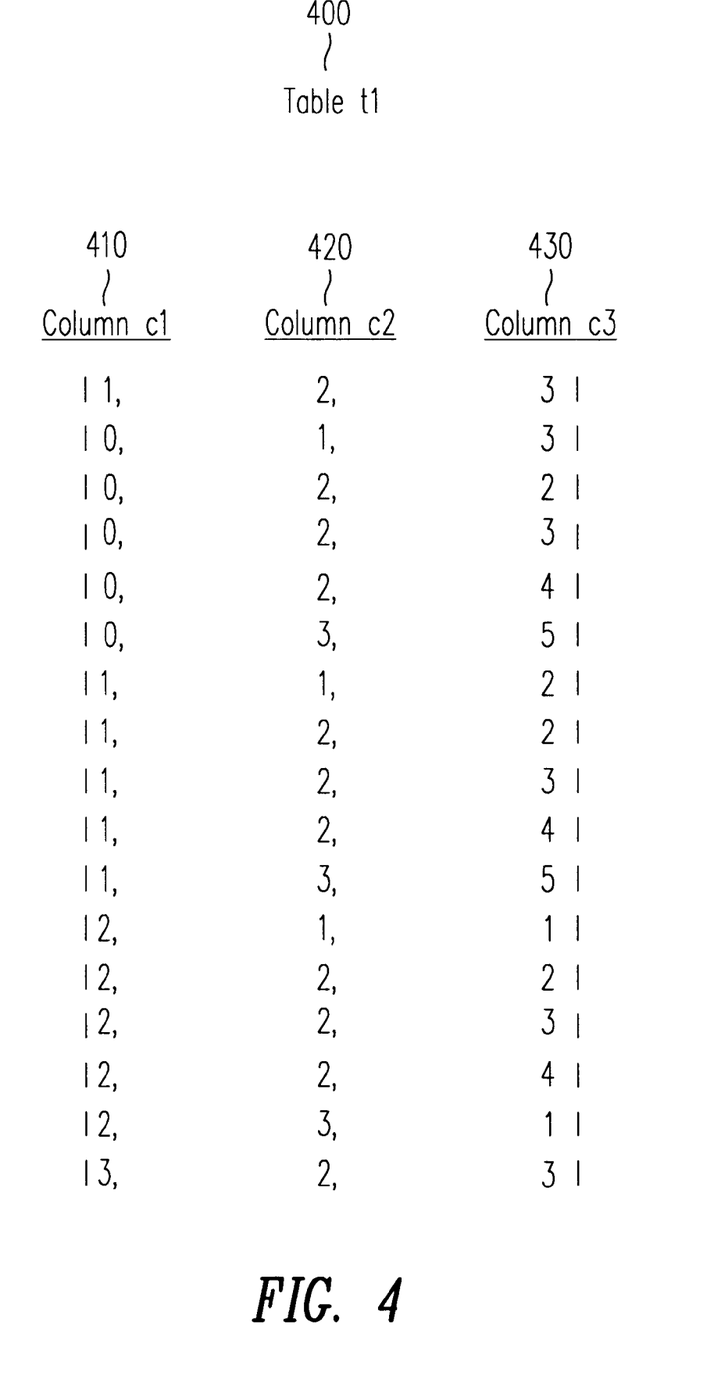
FIG. 4 is a diagram of a table with three columns against which predicates may be applied.

With reference to FIG. 4, a diagram of a table and corresponding rows and columns, assume, for example, table t1 400 with integer data in columns c1 410, c2 420 and c3 430. Further assume an index i1 based on the columns c1 410, c3 420, and c3 430. Data in all of the columns is of an integer data type. Further assume a first set of predicates: c1=1, c2>2, and c3=3 which are applied against the data in table t1 400. The first set of query predicates, like the table data, request data with an integer data type. The first set of query predicates includes two equal operators, and one greater exclusive operator. Further assume a second set of query predicates which requests data having both integer and decimal data types: c1=1.0, c2=2 and c3=3 which are also applied against table t1 400. The second set of query predicates includes all equal operators. In other words, the first predicate requests data in the form table t1 (c1 int, c2 int, c3 int) whereas the second predicate requests data in the form table t1 (c1 dec, c2 int, c3 int).

Beginning with the first set of query predicates (c1=1, c2>2, and c3=3), the data type of data requested in the predicate matches the data type of data in table t1 400. Thus, there are no data type mismatches. The query optimization system 124 determines whether there is a predicate that uses the first index key column c1 410. In this example, there is a predicate that uses column c1 410. Thus, there is at least one index key column that can be used to limit the amount of data retrieved. The query optimization system 124 determines whether the operator OP is an equal (=) operator in which case the analysis would proceed to the next column c2 420. In this case, the operator is an equal (=) operator. As a result, the query optimization system 124 continues to the next key column, column c2 420. With respect to the second key column c2 420, the query optimization system 124 determines whether there a predicate that uses column c2 420. In this example, there is a predicate that uses column c2 420. Thus, there are at least two index key columns that can be used to limit the rows retrieved from table t1 400 to the RDS 116. The query optimization system 124 determines whether the OP operator of the predicate is an equal (=) operator, in which case the analysis would proceed to the next column c3 430. In this example, however, the operator is an exclusive greater (>) operator. As a result, the query optimization system 124 includes column c2 as an index key column but does not proceed further to column c3 430. In summary, if an operator is not an equal (=) operator, the query optimization system 124 includes this column as an index key column. However, if the query optimization system 124 locates a predicate that is not sargable, then the query optimization system 124 does not proceed further and does not include the corresponding column as an index key column.

Continuing with reference to FIG. 4 and the second set of predicates, c1=1.0, c2=2, and c3=3, the predicate c1=1.0 is not sargable because of the different data types called for in the query and the data in column c1 410. More specifically, the c1=1.0 predicate calls for decimal data, whereas data in column c1 410 is integer data.

Conventional systems, in handling non-sargable predicates, do not proceed to other columns and do not include column c1 410 as a key column since the column presents a non-sargable predicate based on the data type mismatch. Thus, conventional systems are forced to retrieve all of the data within the range without the index. Consequently, conventional systems require significantly more time since more data is retrieved and filtered.

Figure 5:
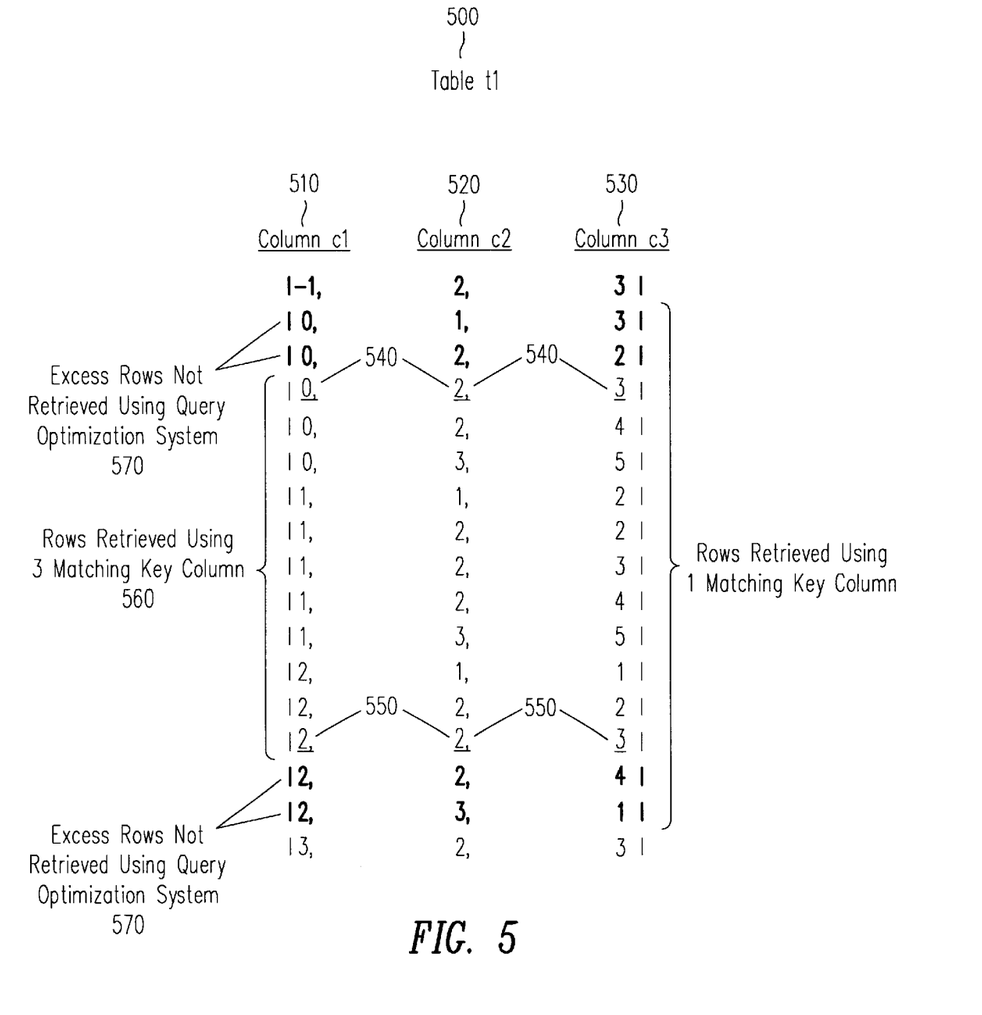
FIG. 5 is a diagram illustrating the advantages of the query optimization system in that fewer data rows are retrieved by maximizing the number of key columns used to select data.

FIG. 5 is a diagram illustrating how the query optimization system 124 retrieves smaller data sets than conventional system by utilizing additional key columns. FIG. 5 illustrates table t1 500 with columns c1 510, c2 520, and c3 530. By maximizing the number of key columns, the query optimization system 124 can more accurately determine the lowbound 540 and highbound 550 values (illustrated as underlined) of an index scan to retrieve a smaller set of data 560.

Conventional systems do not generate sargable predicates from non-sargable predicates involving data type mismatches. Thus, in this particular query example, FIG. 5 illustrates that conventional systems utilize no key columns to retrieve data. As a result, conventional systems retrieve all rows of data, and the RDS is burdened with unnecessary processing and filtering irrelevant data.

Overcoming the deficiencies inherent in conventional systems, the query optimization system 124 generates a new sargable predicate from a non-sargable predicate. For example, based on the non-sargable query predicate c1=1.0, the query optimization system 124 generates the sargable predicate c1 BETWEEN 0 AND 2. An Index Manager 119 may be used to select data since the predicate is a sargable predicate. The Index Manager 119 performs an index scan to retrieve a smaller set of data in contrast to conventional systems which retrieve whole sets of data with table scans. Thus, the query optimization system 124 relieves the RDS 116 from processing and filtering irrelevant data.

Additionally, the query optimization system 124 insures that the BETWEEN operator of the generated sargable predicate does not limit the number of key columns which are used to select data. As illustrated in FIG. 5, the query optimization system 124 uses three index key columns to retrieve values with a lobound value 540 of (0, 2, 3) and a highbound value 550 of (2, 2, 3). With the lobound value 540 and highbound value 550, an Index Manager 119 performs an index scan to select yet a smaller set of rows 560. As a result, the query optimization system 124 does not provide excess rows 570 (illustrated in bold) to the RDS 116, thus minimizing processing and filtering by the RDS 116. With this technique, the query optimization system 124 reduces processing times and improves predicate processing efficiency. Further, those skilled in the art will recognize that these benefits are even more significant when the query optimization system 124 is applied to more complicated queries, larger tables, multiple tables, or more complex data systems.

Conclusion

This concludes the description of embodiments of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of embodiments of the invention has been presented for the purposes of illustration and description. It is not intended to be exhaustive or to limit the invention to the precise forms disclosed. Many modifications and variations are possible in light of the above teaching. It is intended that the scope of the invention be limited not by this detailed description, but rather by the claims appended hereto.

Trademarks

IBM, DB2 and OS/390 are trademarks or registered trademarks of International Business Machines, Corporation in the United States and/or other countries.

What is claimed is:

1. A method of optimizing execution of a query against a database in a datastore of a computer, the method comprising:
   identifying a first query predicate in the query, wherein the first query predicate comprises a comparison between a first data type and a second data type, the first data type is different from the second data type, and the first predicate is non-sargable or directionally-sargable;
   generating a second query predicate with matching data types, wherein the second data type is converted to the first data type, end the second predicate is sargable or semi-sargable; and
   executing the second query predicate against the database to obtain a subset of records.

2. The method of claim 1, further comprising converting an operator of the first query predicate, wherein the second query predicate includes the converted operator.

3. The method of claim 2, wherein the operator is converted from an equal operator to a between operator.

4. The method of claim 3, wherein the between operator functions as greater inclusive and lesser inclusive operators.

5. The method of claim 2, wherein a greater exclusive operator is converted to a greater inclusive operator.

6. The method of claim 2, wherein a lesser exclusive operator is converted to a lesser inclusive operator.

7. The method of claim 1, wherein data requested in the first query predicate is associated with the first data type, and wherein the database records are associated with the second data type.

8. The method of claim 1, wherein the subset of records obtained from the database is associated with the second data type.

9. The method of claim 8, further comprising converting the subset of records from the second data type to the first data type.

10. The method of claim 9, further comprising comparing the converted subset of records to a condition of the first query predicated to obtain a result.

11. The method of claim 10, further comprising applying the remaining query predicates to the result of the first query predicate and any other results of converted query predicates to obtain a final result.

12. The method of claim 1, further comprising compensating for conversion errors.

13. The method of claim 1, wherein a data manager processes the second query predicate to obtain a subset of records.

14. The method of claim 1, wherein an index manager processes the second query predicate to obtain a subset of records.

15. The method of claim 1, wherein the converted predicate enables additional key columns to select a subset of records.

16. An apparatus for optimizing execution of a query, comprising:
   a computer having a data store coupled thereto, wherein the data store stores data; and one or more computer programs, performed by the computer, for:
   identifying a first quay predicate in the query, wherein the first query predicate comprises a comparison between a first data type and a second data type, the first data type is different from the second data type, and the first predicate is non-sargable or directionally-sargable;
   generating a second query predicate with matching data types, wherein the second data type is converted to the first data type, and the second predicate is sargable or semi-sargable; and executing the second query predicate against the database to obtain a subset of records.

17. The apparatus of claim 16, further comprising converting an operator of the first query predicate, wherein the second query predicate includes the converted operator.

18. The apparatus of claim 17, wherein the operator is converted from an equal operator to a between operator.

19. The apparatus of claim 18, wherein the between operator functions as greater inclusive and lesser inclusive operators.

20. The apparatus of claim 17, wherein a greater exclusive operator is converter to a greater inclusive operator.

21. The apparatus of claim 17, wherein a lesser exclusive operator is converted to a lesser inclusive operator.

22. The apparatus of claim 16, wherein data requested in the first query predicate is associated with the first data type, and wherein the database records are associated with the second data type.

23. The apparatus of claim 16, wherein the subset of records obtained from the database is associated with the second data type.

24. The apparatus of claim 23, further comprising converting the subset of records from the second data type to the first data type.

25. The apparatus of claim 24, further comprising comparing the converted subset of records to a condition of the first query predicate to obtain a result.

26. The apparatus of claim 25, further comprising applying the remaining quay predicates to the result of the first query predicate and any other results of converted query predicates to obtain a final result.

27. The apparatus of claim 16, further comprising compensating for conversion errors.

28. The apparatus of claim 16, wherein a data manager processes the second query predicate to obtain a subset of records.

29. The apparatus of claim 16, wherein an index manager processes the second query predicate to obtain a subset of records.

30. The apparatus of claim 16, wherein the convened predicate enables additional key columns to select a subset of records.

31. An article of manufacture comprising a computer program carrier readable by a computer and embodying one or more instructions executable by the computer to optimize execution of a query that accesses data stored on a data store connected to the computer, comprising:

identifying a first query predicate in the query, wherein the first query predicate comprises a comparison between a first data type and a second data type, the first data type is different from the second data type, and the first predicate is non-sargable or directionally-sargable;

generating a second query predicate with matching data types, wherein the second data type is convened to the first data type, and the second predicate is sargable or semi-sargable; and executing the second query predicate against the database to obtain a subset of records.

32. The article of manufacture of claim 31, further comprising converting an operator of the first query predicate, wherein the second query predicate includes the converted operator.

33. The article of manufacture of claim 32, wherein the operator is convened from an equal operator to a between operator.

34. The article of manufacture of claim 33, wherein the between operator functions as greater inclusive and lesser inclusive operators.

35. The article of manufacture of claim 32, wherein a greater exclusive operator is converted to a greater inclusive operator.

36. The article of manufacture of claim 32, wherein a lesser exclusive operator is converted to a lesser inclusive operator.

37. The article of manufacture of claim 31, wherein data requested in the first query predicate is associated with the first data type, and wherein the database records are associated with the second data type.

38. The article of manufacture of claim 31, wherein the subset of records obtained from the database is associated with the second data type.

39. The article of manufacture of claim 38, further comprising converting the subset of records from the second data type to the first data type.

40. The article of manufacture of claim 39, further comprising comparing the converted subset of records to a condition of the first query predicate to obtain a result.

41. The article of manufacture of claim 40, further comprising applying the remaining query predicates to the result of the first query predicate and any other results of converted query predicates to obtain a final result.

42. The article of manufacture of claim 31, further comprising compensating for conversion errors.

43. The article of manufacture of claim 31, wherein a data manager processes the second query predicate to obtain a subset of records.

44. The article of manufacture of claim 31, wherein an index manager processes the second query predicate to obtain a subset of records.

45. The article of manufacture of claim 31, wherein the converted predicate enables additional key columns to select a subset of records.

\* \* \* \* \*

UNITED STATES PATENT AND TRADEMARK OFFICE
CERTIFICATE OF CORRECTION

PATENT NO.   : 6,571,233 B2
DATED        : May 27, 2003
INVENTOR(S)  : Thomas A. Beavin et al.

It is certified that error appears in the above-identified patent and that said Letters Patent is hereby corrected as shown below:

<u>Column 16,</u>
Line 60, "quay" should read -- query --

<u>Column 17,</u>
Line 42, "convened" should read -- converted --

<u>Column 18,</u>
Lines 2 and 13, "convened" should read -- converted --

Signed and Sealed this

Twenty-fifth Day of November, 2003

JAMES E. ROGAN
*Director of the United States Patent and Trademark Office*